US011366964B2

(12) United States Patent
Ross

(10) Patent No.: US 11,366,964 B2
(45) Date of Patent: Jun. 21, 2022

(54) VISUALIZATION OF THE ENTITIES AND RELATIONS IN A DOCUMENT

(71) Applicant: INTERNATIONAL BUSINESS MACHINES CORPORATION, Armonk, NY (US)

(72) Inventor: Steven I. Ross, S. Hamilton, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/703,854

(22) Filed: Dec. 4, 2019

(65) Prior Publication Data

US 2021/0174014 A1 Jun. 10, 2021

(51) Int. Cl.
| | | |
|---|---|---|
| *G06F 17/10* | (2006.01) | |
| *G06F 40/205* | (2020.01) | |
| *G06F 16/14* | (2019.01) | |
| *G06F 40/177* | (2020.01) | |
| *G06F 40/40* | (2020.01) | |
| *G06F 16/93* | (2019.01) | |
| G06F 3/04842 | (2022.01) | |

(52) U.S. Cl.
CPC ......... *G06F 40/205* (2020.01); *G06F 16/148* (2019.01); *G06F 16/156* (2019.01); *G06F 16/93* (2019.01); *G06F 40/177* (2020.01); *G06F 40/40* (2020.01); G06F 3/04842 (2013.01)

(58) Field of Classification Search
CPC ...... G06F 40/205; G06F 40/40; G06F 40/177; G06F 16/93; G06F 16/156; G06F 16/148; G06F 3/04842
See application file for complete search history.

(56) References Cited

U.S. PATENT DOCUMENTS

| | | | | |
|---|---|---|---|---|
| 5,339,391 A | * | 8/1994 | Wroblewski | ........ G06F 3/04855 345/607 |
| 5,636,350 A | * | 6/1997 | Eick | ........................ G06F 3/033 715/764 |
| 5,644,692 A | * | 7/1997 | Eick | .................... G06F 3/04847 715/833 |
| 6,055,515 A | | 4/2000 | Consentino et al. | |
| 6,961,954 B1 | * | 11/2005 | Maybury | .............. G06F 16/745 725/53 |
| 7,162,465 B2 | * | 1/2007 | Jenssen | ................ G06F 40/242 |
| 7,672,833 B2 | * | 3/2010 | Blume | ................. G06F 40/295 704/10 |

(Continued)

OTHER PUBLICATIONS

Byrd, D., "A Scrollbar-based Visualization for Document Navigation"; ACM Inc (1999); 8 pgs.

(Continued)

*Primary Examiner* — Shahid K Khan
(74) *Attorney, Agent, or Firm* — Intelletek Law Group, PLLC; Gabriel Daniel, Esq.

(57) ABSTRACT

A computer-implemented method, non-transitory computer readable storage medium, and computing device for visualizing entities and relations within a file. The content of at least one portion of a file is parsed by natural language processing (NLP). A frequency is determined of one or more entities within the at least one portion of the file parsed by NLP. Visualization data is generated of at least one entity of the one or more entities in the file, and is output for display.

19 Claims, 9 Drawing Sheets

(56) References Cited

U.S. PATENT DOCUMENTS

| | | | | |
|---|---|---|---|---|
| 8,239,778 | B2* | 8/2012 | Sheth-Voss | G06F 16/252 715/967 |
| 9,639,518 | B1* | 5/2017 | Goodspeed | G06Q 30/0281 |
| 9,715,497 | B1* | 7/2017 | Bhadbhade | G06F 40/284 |
| 11,232,268 | B1* | 1/2022 | Platt | G06F 16/248 |
| 2004/0243388 | A1* | 12/2004 | Corman | G06F 40/211 704/1 |
| 2005/0278325 | A1* | 12/2005 | Mihalcea | G06F 40/284 |
| 2006/0074836 | A1* | 4/2006 | Gardner | G06N 5/04 706/45 |
| 2007/0118551 | A1* | 5/2007 | Akkiraju | G06Q 10/06 707/999.102 |
| 2009/0112892 | A1* | 4/2009 | Cardie | G06F 16/93 |
| 2012/0158644 | A1* | 6/2012 | Mital | G06F 16/254 707/602 |
| 2014/0136184 | A1* | 5/2014 | Hatsek | G06F 40/295 704/9 |
| 2014/0189501 | A1* | 7/2014 | Demiralp | G06F 40/279 715/764 |
| 2014/0229475 | A1 | 8/2014 | Walsh | |
| 2015/0244657 | A1* | 8/2015 | Ghafourifar | G06F 16/951 709/206 |
| 2016/0092530 | A1* | 3/2016 | Jakubiak | G06F 3/04842 715/202 |

OTHER PUBLICATIONS

Mell, P. et al., "Recommendations of the National Institute of Standards and Technology"; NIST Special Publication 800-145 (2011); 7 pgs.

* cited by examiner

VISUALIZATION OF THE ENTITIES AND RELATIONS IN A DOCUMENT

BACKGROUND

Technical Field

The present disclosure generally relates to systems and methods for displaying text, and more particularly, for visually identifying content.

Description of the Related Art

There is an ever-increasing amount of content that is accessible online. The increase in content also increases the time spent sifting through documents to determine whether desired information is actually within a document. This problem continues to increase as the number of sources available online for any given topic continue to expand.

Previous efforts to identify content in a list of documents have been directed mainly to highlighting certain words entered by a user. For example, in word processing programs such as MS Word©, a user may enter a particular word and then forward through a document to review each instance of the searched word one at a time.

U.S Pat. Application Publication 20140229475_A1 to Walsh discloses a method and system for document analysis using GUI tools that permit an initial loading of multiple keyword groups into blocks of conceptually related keywords. As the user navigates through a list of documents the keywords are counted and displayed in colors according to the highest count.

U.S. Pat. No. 9,639,518 B1 to Goodspeed et al. discloses a Method for Identifying Entities in a Digital Work. The occurrences of names are identified and extracted from the text of a digital work to generate a list of at least some of the names and their location information.

A paper entitled 'A *Scrollbar-based Visualization for Document Navigation*" (Donald Byrd, University of Massachusetts, 1999), discloses the use of scrollbars of various colors to identify features of documents.

SUMMARY

According to various embodiments, a computing device, a non-transitory computer readable storage medium and a computer-implemented method for visualization of entities and relations in a document are set forth herein.

Whereas previous attempts in the art to identify content in a list of documents as discussed above were directed to the display of certain keywords that are highlighted and may include a count of such keywords in a document, the present disclosure utilizes natural language processing entity and relation extraction capabilities. In the present disclosure, the computing device, non-transitory computer readable storage medium and computer-implemented method may show explicitly the portions of a document associated with specific entities. In addition, in the present disclosure there is taught a capture and display of relations between the identified entities.

In one embodiment, a computer-implemented method for visualization of the entities and relations in a document includes the operations of parsing a content of at least one portion of a file by natural language processing (NLP) and determining a frequency of one or more entities within the at least one portion of the file parsed by NLP. A visualization data of at least one entity in the file is generated, and the visualization data is output for display.

In one embodiment, the parsing of a content further includes performing a relation extraction between the one or more entities.

In one embodiment, the visualization data is configured to display the relation between the one or more entities, in response to a selection.

In one embodiment, the generating of visualization data includes a representation of the determined frequency of the one or more entities within the file.

In one embodiment, the visualization data includes labeling the one or more entities with at least one of text or images. The labeling of the one or more entities is visible or hidden. When the labeling is hidden, it may be displayed in response to a detected hovering of a pointing device, or a selection of a particular entity.

In one embodiment, the file includes a text document, and the visualization data is configured for display in conjunction with the text document. The visualization data is spatially registered with display of the text document. The visualization data is configured for display in columns within the text document.

In one embodiment, the visualization data is configured for display in columns in response to an inquiry.

In one embodiment, the columns are auto-generated based on a determined frequency of the entities.

In one embodiment, the visualization data is configured for display in columns as at least one of photos, logos, or graphics.

In one embodiment, a computing device includes: a processor; a storage device coupled to the processor, and a visualization module coupled to the processor. An execution of the visualization module by the processor configures the computing device to parse a content of at least a portion of a file by natural language processing (NLP), and determine a frequency of one or more entities within at least the portion of the file parsed by NLP. Visualization data is generated for at least one entity in the file, and the visualization data is output for display.

In one embodiment, the visualization module is further configured to display relation extraction information between the one or more entities for display. The visualization data is spatially registered with display of the text document.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Overview

In the following detailed description, numerous specific details are set forth by way of examples to provide a thorough understanding to a person of ordinary skill in the art. In one embodiment, the content of at least a portion of a file (and the determining of a frequency of one or more entities) is performed by parsing using NLP.

Entities may be identified from the NLP parsing by various operations, for example, by converting groupings of text into representations that facilitate manipulation by computer programs. For a particular grouping of text, the relationships among named entities can be identified and extracted (e.g., by way of relation extraction). The identification of the relationships can be identified through the use of ontologies, such as, for example, domain ontologies. Other identification methods of the relationships may be performed using NLP. For example, certain terminology may be used to identify relationships (e.g., "team mate" "co-worker," "manager"). In addition, nicknames may be identified by certain terminology (e.g., "also known as," "referred to") using NLP.

Example Architecture

Figure 1:
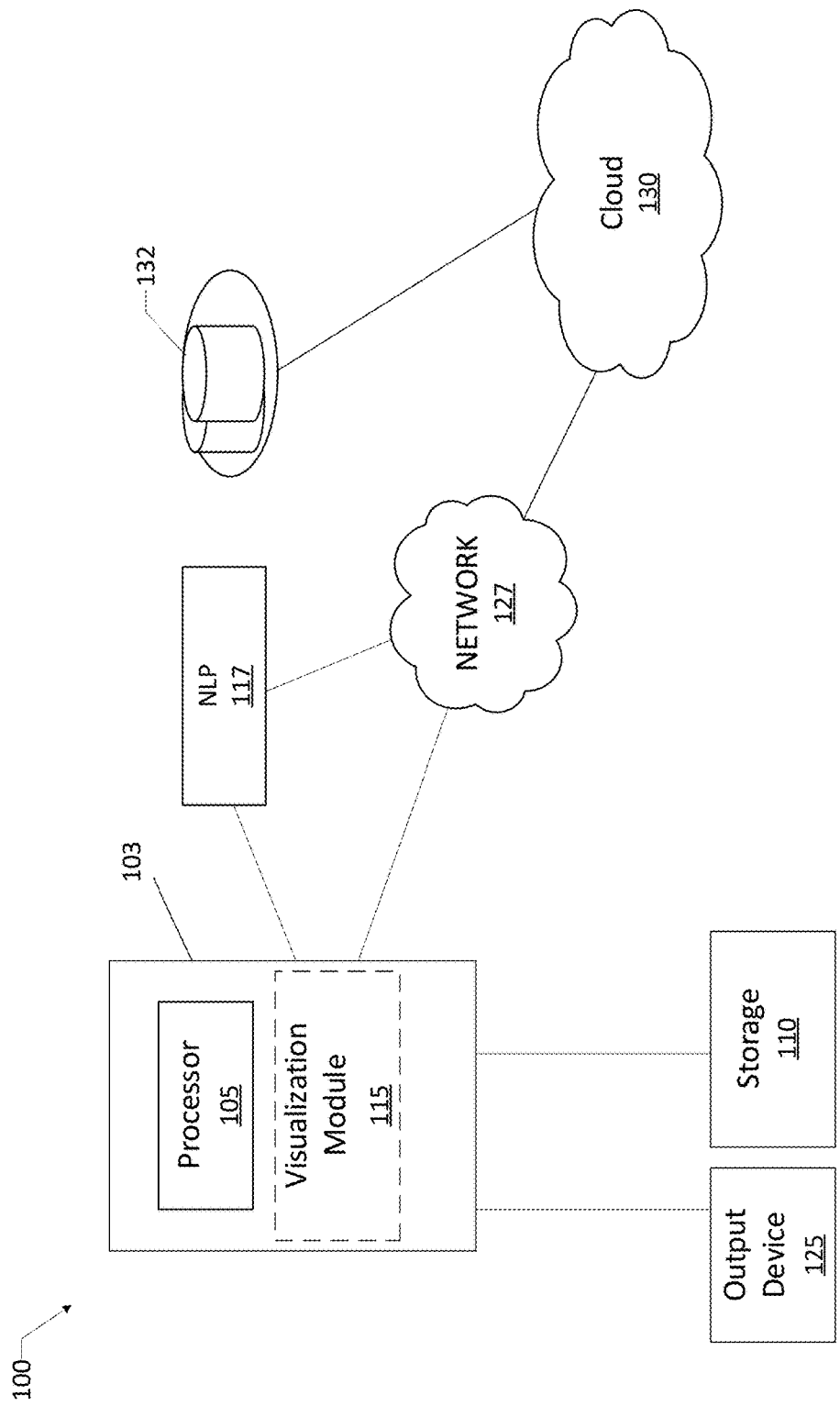
FIG. 1 is a diagram of an example architecture, consistent with an illustrative embodiment.

FIG. 1 illustrates a block diagram 100 of an example architecture consistent with an illustrative embodiment. A computing device 103 includes a processor 105, and a visualization module 115 that may be stored in a storage 110 coupled to the computing device 103 and loaded into the processor 105 for execution. The computing device 103 is connected to the cloud 130 via network 127. A file, which may include a text document, may be stored in storage 110 and is retrieved by the processor 105. Alternatively, one or more files stored in remote storage 132 may be retrieved by a server in cloud 130 and provided to computing device 103. The processor 105 is configured by the visualization module 115 to perform, for example, operations such as discussed herein below in FIG. 2 in conjunction with the NLP module 117. The visualization module 115 generates visualization data that is provided to output device 125. Output device 125 may be a display coupled to the computing device 103. A text document that has been annotated with visualization data may be stored in storage 110.

The NLP component 117 may be trained by machine learning. In unsupervised learning, historic data can be provided without labels to teach groupings of words that can constitute an entity. The relationship between entities can be taught to the NLP component 117. Such algorithms can operate by building a model from stored prior inputs or baselines therefrom in order to make data-driven predictions or decisions (or to provide threshold conditions) to indicate whether a word or group of words constitute an entity. As shown in FIG. 1, the NLP component 117 may be coupled to the computing device 103 locally or via the network 127.

In addition, the NLP component 117 may make use of machine learning to parse the content of various documents. The machine learning may make use of techniques including supervised learning, unsupervised learning, semi-supervised learning, naïve Bayes, Bayesian networks, decision trees, neural networks, fuzzy logic models, and/or probabilistic classification models.

With further regard to the NLP component 117, the entities that are parsed for NLP can be auto-generated based on predetermined criteria such as frequency within the document, or can be parsed in response to a user request. The user request may be written or via voice. For example, it will be understood that the visualization module 115 may include a language agent 545 (FIG. 5) that uses NLP to parse a request received from the user. For example, a conversation agent can perform speech recognition to determine the textual representation of a spoken user request. In natural speech, there may not be discernable pauses between successive words. To that end, speech segmentation may be performed to separate the words into meaningful sentences.

In one embodiment, concept expansion, such as the IBM Watson® concept expansion, can be used to identify the concept cues in the file to determine the intent thereof. In this regard, large sets of unstructured sets of data may be provided to a language agent, such that it can learn therefrom. The large sets of unstructured data may relate to a prior IT request that was successfully handled by a private network, which now acts as a corpus of data to learn from. Such concept expansion enables the creation of a specialized dictionary for the cognitive application of identifying the subject matter and scope of the IT request, collectively referred to herein as the "intent" of the request. Concept expansion enables the language agent to build a specialized dictionary for the cognitive application of interacting with a user having an IT request. In one example, unstructured source text that may not include well-formed language, such as email, text messages, and text that has been extracted via speech recognition may be used to build the specialized dictionary. Accordingly, the conversation agent can correctly understand industry-specific terminology, local euphemisms, and colloquial terms that traditional chatbots may be challenged with.

By virtue of the concepts discussed herein, various aspects of the present disclosure provide for an improvement in computer operation and in another technology (e.g., the visualization of entities and objects within a document facilitates a user's determination as to whether the content of the document includes the desired information without wasting computer resources sifting through the document in its entirety, and repeating such streamlined review for a stack of documents). The locations of the various entities within the document may be provided to provide for a more efficient review of the content of documents. The result is a large reduction/elimination of the utilization of resources associated with determining content and the relations between entities in the document. The many advantages include that a reader's time and effort in evaluating a document may be reduced and the comprehension of the contents of the document is enhanced. Moreover, the various aspects, as discussed herein, improve computer operation by reducing the utilization of resources associated with searching. Reduced CPU cycles, reduced memory usage, and less network utilization are provided.

Example Process

Figure 2:
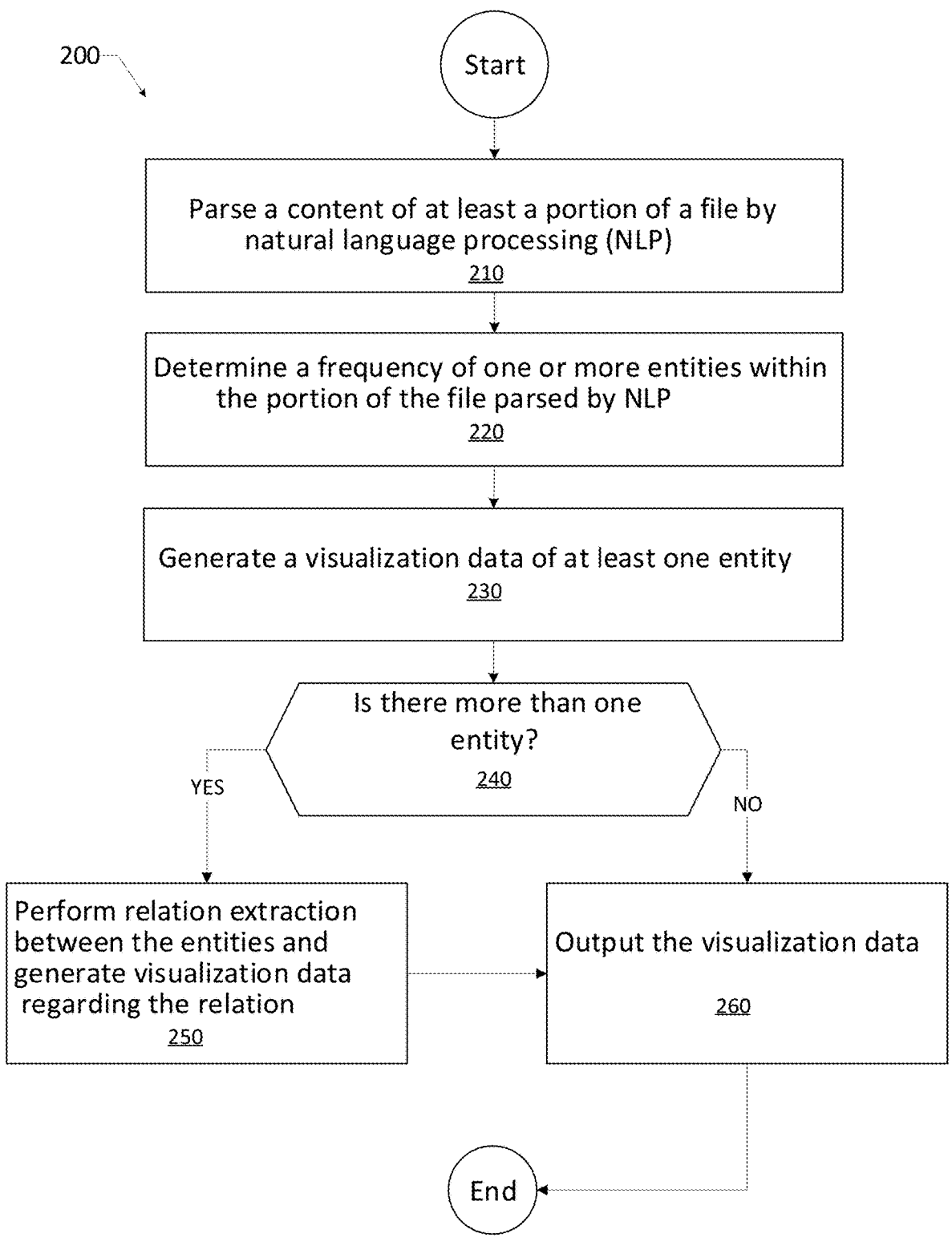
FIG. 2 is a flowchart illustrating operation of an algorithm of a computer-implemented method for visualization of the entities and relations, consistent with an illustrative embodiment.

With the foregoing overview of the example architecture of FIG. 1, it may be helpful now to consider a high-level discussion of an example process. To that end, FIG. 2 presents in 200 an illustrative process related to recognizing patterns consistent with an illustrative embodiment in conjunction with FIGS. 3A, 3B, 3C and 4. FIG. 2 is illustrated as a collection of blocks, in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

At 210, a processor of a computing device configured to perform visualization of the entities and relations parses a content of at least a portion of a file by natural language processing (NLP). The use of NLP provides for a more thorough parsing of the file in which groupings of words can be, for example, converted into representations that facilitate manipulation by computer programs. For a particular chunk of text, the relationships among named entities can be identified and extracted (e.g., relations extraction). The identification of the relationships can be identified through the use of ontologies, such as, for example, domain ontologies.

Figure 3A:
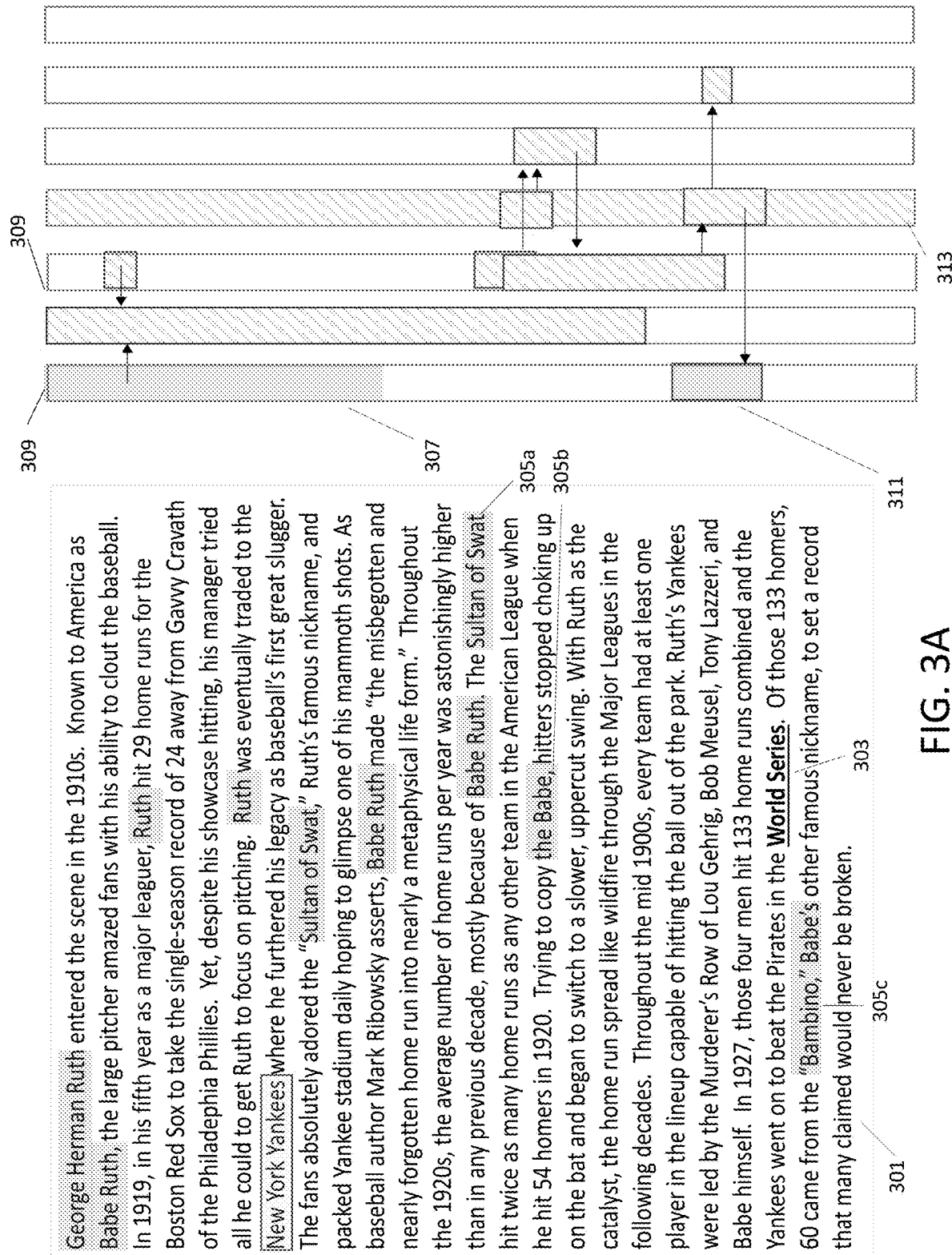
FIG. 3A depicts an example of a text document having an adjacent output of columns displaying visualization data and relationship data consistent with an illustrative embodiment.

At 220, a frequency of the one or more entities within the portion of the file parsed by NLP is determined. For example, referring to FIG. 3A, a number of times the baseball player Babe Ruth is referred to is determined. As can be seen in FIG. 3A, the baseball player Babe Ruth is referred by a plurality of names. For example, his formal name "George Herman Ruth" is initially mentioned in line 1 of the passage. He is also referred to as "Babe Ruth," the "Sultan of Swat" 305a, "The Bambino" 305c and "The Babe" 305b.

At 220, visualization data is generated that includes a representation of at least one entity based on the parsing operation via NLP and the frequency determination discussed with regard to operations 410 and 420. The visualization data is generated to facilitate a representation of content by visualizing entities (and their relation) at a glance. The visualization data can be generated into various formats for display as desired. One non-limiting example of a format is to arrange the data for display in columns. It is to be understood that the present disclosure is not limited to display visualization data in columns (or rows), as other types of formats for the graphical display of the visualization data may be used.

Figure 3B:
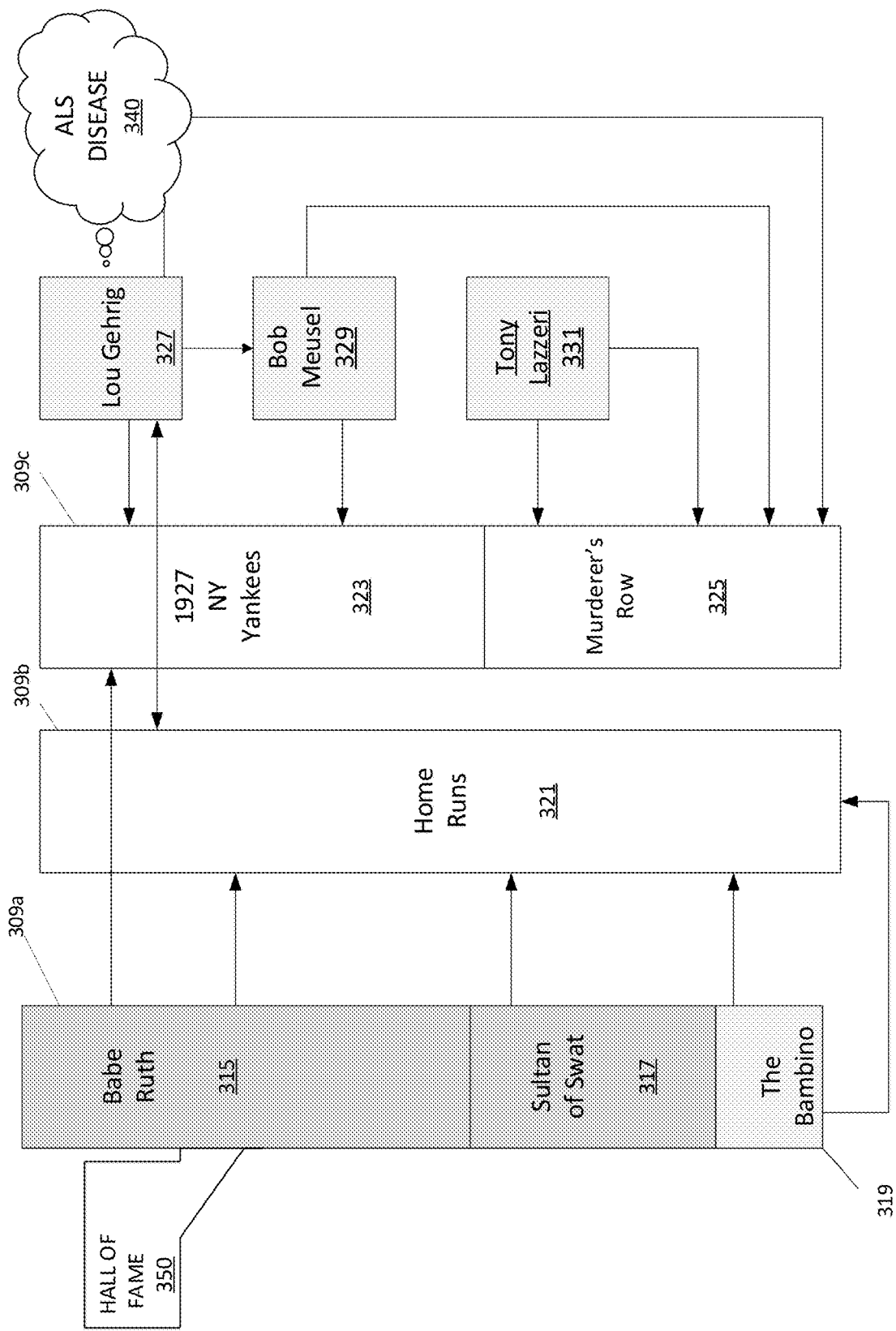
FIG. 3B depicts an example of labeling of the columns consistent with an illustrative embodiment.
Figure 3C:
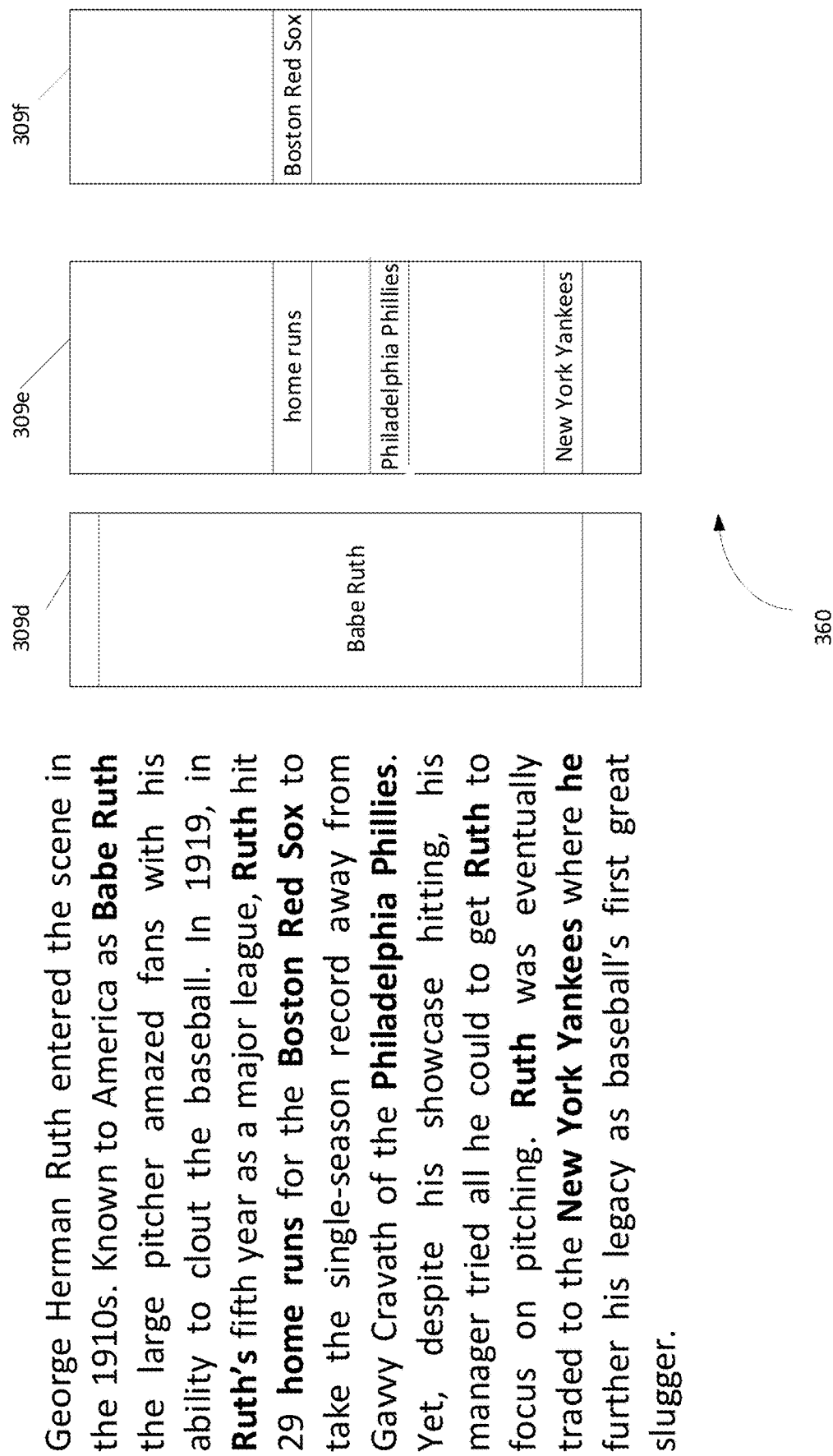
FIG. 3C depicts the visualization data configured to display a spatial registration of the entities that correspond to their locations within a document, consistent with an illustrative embodiment.

FIGS. 3A and 3B illustrate an example of a text document having an adjacent output of columns displaying visualization data and relationship data, consistent with an illustrative embodiment. In this illustrative embodiment, particularly in FIG. 3B, the visualization data and relationship data is displayed without indicating a spatial registration of the entities (FIG. 3C illustrates an embodiment including the spatial registration of entity regions relative to their location in a document). While in FIG. 3A a plurality of columns 309 are shown adjacent to text 301, it will be understood that the concepts discussed herein are not limited to this depiction. For example, the visualization data can be any type of visual indicator identified by color coding, size, blinking, etc. A subheading 311 of a main item 307 may be shown on the same column 309 (name and nickname). Also, a column 309 may include a slanted shading 313 that may have a predetermined meaning. The visualization data may also be displayed without the adjacent text 301. In addition, the words in the text that are part of identities may be identified in the text, for example, by highlighting.

It is also within the scope of the present disclosure that the visualization data may be represented by audio-visual indications. Moreover, if the user is visually impaired an audio representation may be utilized by, for example, clicking on or touching boxes, columns, icons, etc., on the display.

Referring back to FIG. 2, at operation 240, if there is one entity discovered from the parsing, the visualization data is output at 260. The output may be a display and the visualization data inserted into the document, or displayed in another window adjacent to the document. It is to be understood that the concepts discussed herein are not limited to a document such as a word processing document, and may be utilized in conjunction with a browser. The visualization data can be overlaid on the display of the search results, or a visualization module may be an add-on module to the browser.

With reference to operation 250, if there is more than one entity detected, a relation extraction may be performed and the visualization data may include the relation data. This visualization data may be provided as an output at operation 260. Referring to FIG. 3B, the arrows shown pointing between entities in the various columns show the existence and nature of the detected relations between the entities.

It is to be understood that the concepts discussed herein are not limited to the flowchart shown in FIG. 2. For example, if there are multiple entities, the visualization data may be output without performing operation 250, and the multiple entities may be displayed without showing the relation between the entities.

FIG. 3B is an example of one of many ways the columns may be labeled, consistent with an illustrative embodiment. An artisan is to understand that FIG. 3B is presented for illustrative purposes regarding how the visualization data may be configured for display, and that the visualization data may be configured to display a spatial registration of the entities corresponding to their locations in a document (see FIG. 3C).

FIG. 3B depicts entities parsed from the writing of Babe Ruth shown in FIG. 3A. For example, FIG. 3B shows in column 309a the various terms used to refer to Babe Ruth 315 that were identified by parsing using NLP. The relationship of Babe Ruth to the 1927 New York Yankees 323 (column 309a) and to home runs 320 (column 309b) based on the arrows shown. The alternative term for the 1927 New York Yankees 323 (Murderer's Row) 325 is depicted in column 309c. Whereas column 309a depicts alternate references to Babe Ruth, column 309c depicts an alternate reference to the 1927 New York Yankees identified by NLP (the 1927 Yankees had a nickname "Murderer's Row" 325 because of their complete domination of other teams in the league). In addition, teammates Lou Gehrig 327, Tony Lazzeri 329, and Bob Muesel 331 are shown as being related to the 1927 NY Yankees 323. As all four of the teammates shown were members of the team dubbed "Murderer's Row", this relationship is depicted by the use of arrows from each of the players to the nickname Murderer's Row 330 shown in FIG. 3B. Babe Ruth's nicknames "Sultan of Swat 310" and "The Bambino 315" are also shown in FIG. 3B.

With continued reference to FIG. 3B, in response to a hovering operation by a pointing device, the additional information "Hall of Fame" 350 is displayed regarding Babe Ruth 305. The same information would be displayed if the pointing device is hovered over Lou Gehrig 327. The term Hall of Fame 350 may be hypertext, and if selected may link the user to a page from the Hall of Fame in Cooperstown, N.Y. for more information about Babe Ruth.

The visualization data may be configured for display in many forms that may enhance a user's understanding of a content within a document. As shown in FIG. 3B, there is a label 340 for ALS Disease, that ended the career and life of Lou Gehrig 327. The label 340 may be a link to an ALS Foundation, or provide information about what happened to Lou Gehrig from diagnosis of his illness, to his retirement speech, and then his untimely demise. In addition, the visualization data may include tag clouds to facilitate comprehension and permit the user to retrieve additional information about one or more entities displayed. The tag clouds may be displayed in various sizes and colors. In an embodiment, the visualization data may be displayed as spatially registered items correlating to a location of the entities within a document.

FIG. 3C depicts the visualization data configured to display a spatial registration of the entities that corresponds to their locations within a document, consistent with an illustrative embodiment.

In the embodiment illustrated in FIG. 3C, there are multiple columns 309*d*, 309*e*, 309*f* for entities that occupy the area in a column corresponding to their vertical location within the text. In addition, there can be a consolidation of multiple consecutive mentions of a particular entity or entities, when the mentions occur close to each other in a document (as shown in column 309*d*).

In the particular illustration shown in FIG. 3C, the columns are separated to show visual indications of groups of lines 360 within the document. For example, column 309*d* depicts lines 2-11 as being associated with Babe Ruth, column 309*e* depicts entities home runs on line 6, Philadelphia Phillies on line 8, and New York Yankees on line 12, and column 309*f* depicts entity Boston Red Sox on line 6. An artisan is to understand that there can be fewer columns or more columns than shown in FIG. 3C. In addition, in the groups of lines 360 could be pages, chapters, etc. In the extreme, a single column, or multiple thin columns corresponding to the scroll bar could represent the entire document, indicating where the major entities referenced in the document are located in that document. The columns 309*d*, 309*e*, 309*f* show the spatial registration with the entities in the text (e.g. vertical registration). It is to be understood that the size and spacing of the columns are not in any way limited to the examples shown.

Still referring to FIG. 3C, it can be seen that through the use of NLP, the terms Babe Ruth, Ruth, and "he" can all be visually displayed as Babe Ruth to assist the user in ascertaining the content of the document.

In addition, in an embodiment, the entities can be displayed in response to the determined frequency of each entity reaching a predetermined threshold. For example, each entity may not be displayed unless it is present in at least three locations within the document. The predetermined threshold may be a user-changeable setting. In addition, the number of columns displayed may also be a user-changeable setting that has an initial default value. Moreover, the number of columns may be expandable in response to a user selection, such as in response to right clicking on one of the columns, or from selecting an item displayed on a menu or dashboard. The display of multiple columns and/or additional data as an expandable selection provides an advantage of preventing the display from appearing cluttered with too much detail that may not interest a user.

Referring back to FIG. 3A, the text displayed may range from a few words to a paragraph, a page, pages, chapters, etc. The use of columns, such as shown in FIGS. 3A and 3B, may be representative of an entire document to facilitate an understanding about the content of the document at a glance. However, the visualization data may be displayed in various formats that can provide at a glance information about an entire document or portions of a document.

Figure 4:
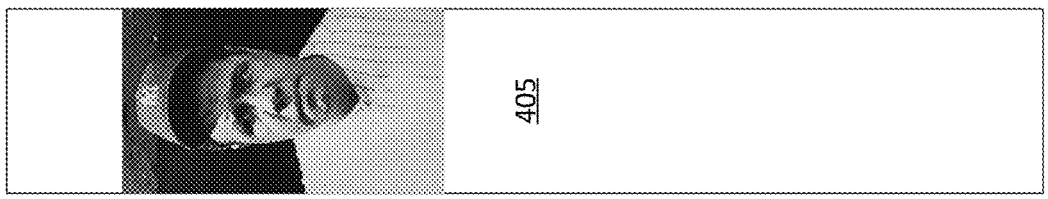
FIG. 4 depicts an example of a column displaying visualization data consistent with an illustrative embodiment.

FIG. 4 depicts an example of a column 400 displaying visualization data, consistent with an illustrative embodiment. FIG. 4 depicts a column 405 that shows an image of Babe Ruth rather than his name. It is to be understood that both the image and the name may be included to assist those who may not recognize Babe Ruth from the image.

Example Computer Platform

Figure 5:
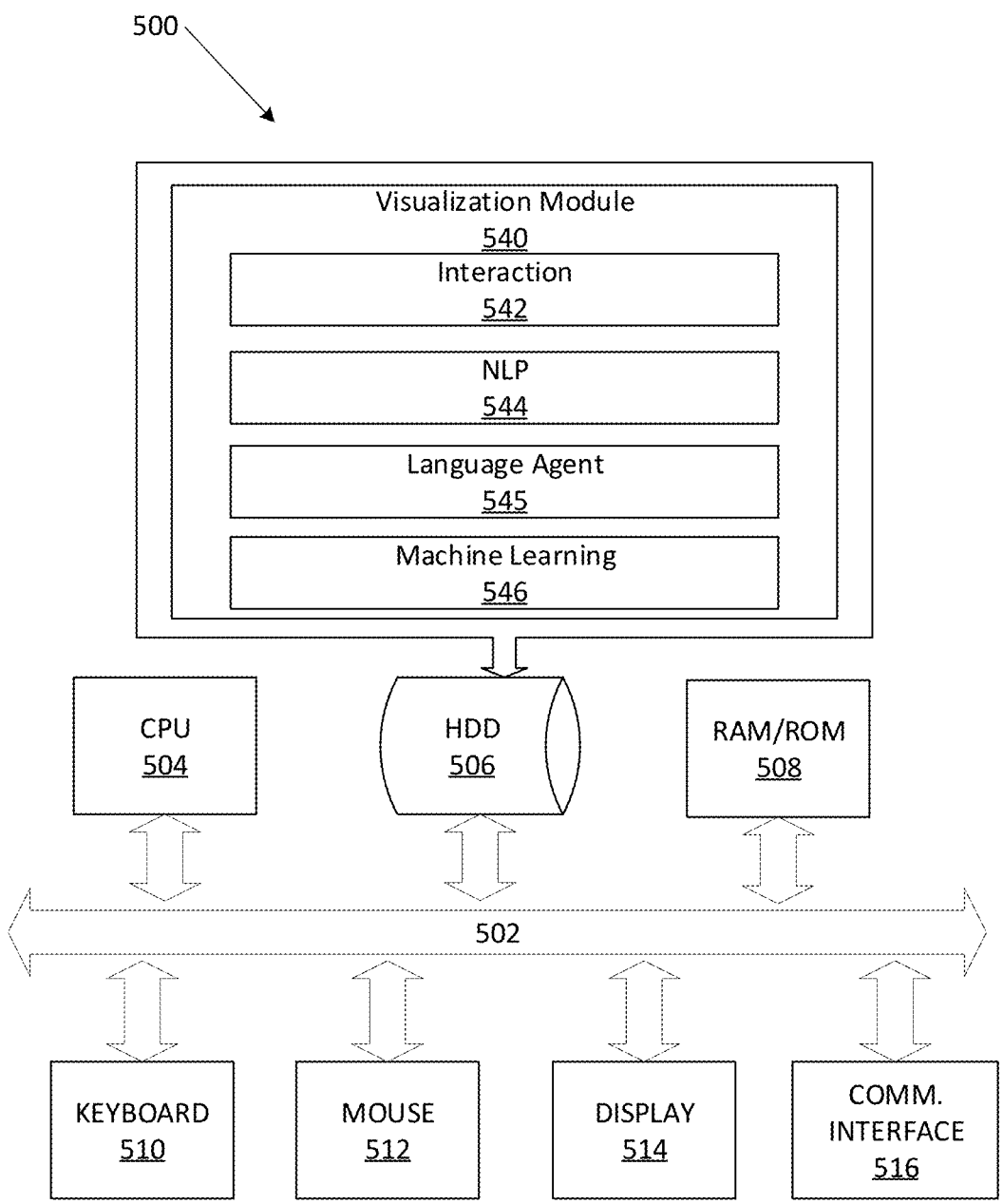
FIG. 5 is a functional block diagram illustration of a computer hardware platform that can be used to implement a computing device configured for operation consistent with an illustrative embodiment.

As discussed above, functions relating to the visualization of the entities and relations in a document can be performed with the use of one or more computing devices connected for data communication via wireless or wired communication, as shown in FIG. 1 and in accordance with the process of FIG. 2, and the implementations in FIGS. 3A, 3B, 3C, and 4. FIG. 5 is a functional block diagram illustration of a computer hardware platform that can be used to implement a particularly configured computing device for generating visualization data and relationship data shown in FIG. 1, consistent with an illustrative embodiment. In particular, FIG. 5 illustrates a network or host computer platform 500, as may be used to implement an appropriately configured server.

The computer platform 500 may include a central processing unit (CPU) 504, a hard disk drive (HDD) 506, random access memory (RAM) and/or read only memory (ROM) 508, a keyboard 510, a mouse 512, a display 514, and a communication interface 516, which are connected to a system bus 502.

In one embodiment, the HDD 506 has capabilities that include storing a program that can execute various processes, such as the visualization module 540 that executes the method for visualization of entities and relations in a manner described herein. Additional modules can be configured to perform different functions. For example, there may be an interaction module 542 that is operative to receive electronic data from various sources, a natural language processing NLP module 544.

There may be a machine learning module 546 operative to, during a training phase, learn from historical data to build one or more machine learning models that can be used to identify entities and relations and generate visualization data based on the entities and relations, in a manner discussed herein.

In one embodiment, a program, such as Apache™, can be stored for operating the system as a Web server. In one embodiment, the HDD 506 can store an executing application that includes one or more library software modules, such as those for the Java™ Runtime Environment program for realizing a JVM (Java™ virtual machine).

Example Cloud Platform

As discussed above, functions relating to the visualization of the entities and relations in a document may include a cloud. It is to be understood that although this disclosure includes a detailed description on cloud computing, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
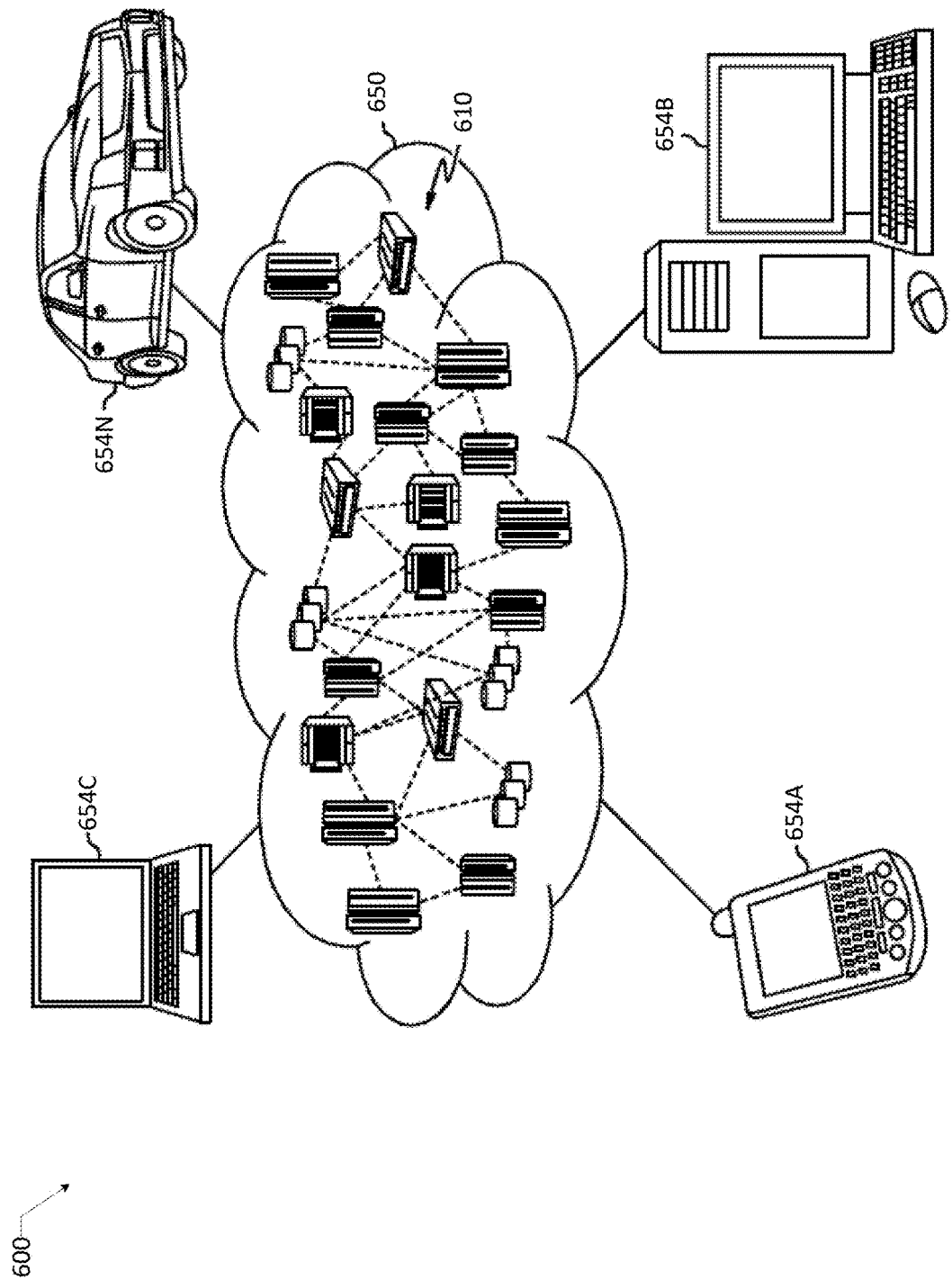
FIG. 6 depicts a cloud computing environment, consistent with an illustrative embodiment.

FIG. 6 depicts a cloud computing environment, consistent with an illustrative embodiment. Referring now to FIG. 6, an illustrative cloud computing environment 600 is depicted. As shown, cloud computing environment 600 includes one or more cloud computing nodes 610 with which local computing devices used by cloud consumers, such as, for example, personal digital assistant (PDA) or cellular telephone 614A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
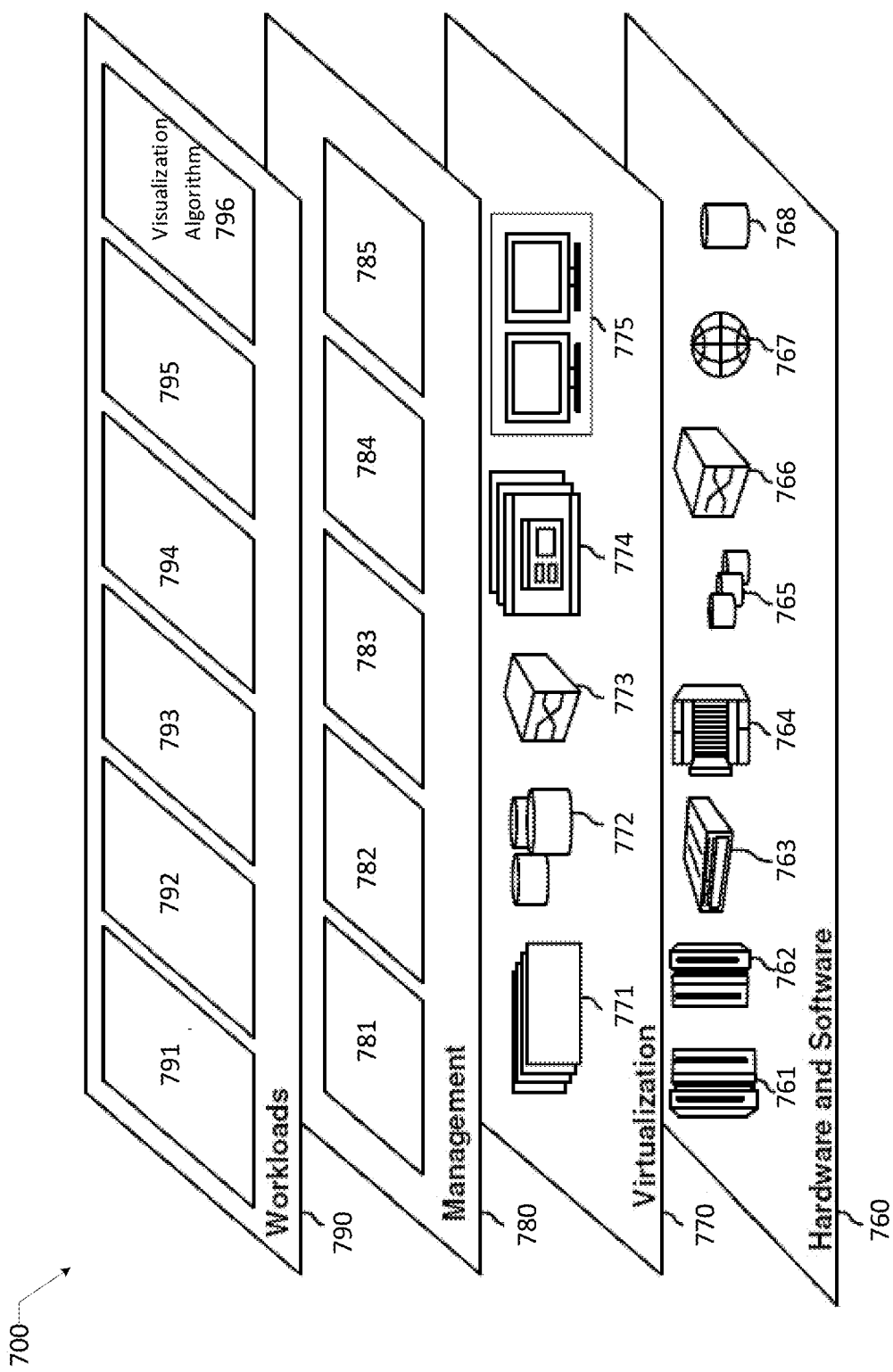
FIG. 7 depicts abstraction model layers, consistent with an illustrative embodiment.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the disclosure are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and visualization algorithm 796 as discussed herein.

Conclusion

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method for visualizing entities and relations within a file, the method comprising:
    parsing a content of at least one portion of a file by natural language processing (NLP) based on machine learning, comprising:
        identifying a same entity having different names; and
        performing a relation extraction between the one or more entities detected within the file;
    determining a frequency of one or more entities detected within the at least one portion of the file parsed by NLP, wherein the determination of the frequency is able to include the different names of the same entity;
    generating a visualization data of at least some of the one or more entities detected within the file comprising pointers between entities based on a relation between the some of the one or more entities within the file, wherein:
        the visualization data is configured for display in columns within the file, and
        the columns are auto-generated based on a predetermined threshold of the determined frequency of the one or more entities; and
    outputting the visualization data for display.

2. The computer-implemented method of claim 1, wherein the one or more entities detected within the file are represented by groups of one or more words.

3. The computer-implemented method of claim 1, wherein the visualization data is further configured to display the relation between the one or more entities detected within the file, in response to a selection.

4. The computer-implemented method of claim 1, wherein generating the visualization data includes generating a visual representation of the determined frequency of the one or more entities detected within the file.

5. The computer-implemented method of claim 1, wherein generating the visualization data includes labeling the one or more entities detected within the file with at least one of text or images.

6. The computer-implemented method of claim 5, wherein a representation of the one or more entities detected within the file includes a tag cloud.

7. The computer-implemented method of claim 5, wherein the labeling of the one or more entities detected within the file comprises a visible labeling or a hidden labeling.

8. The computer-implemented method of claim 7, further comprising configuring the hidden labeling to be displayed in response to a detected hovering or a selection by a pointing device.

9. The computer-implemented method of claim 1, wherein:
    the file comprises a text document, and
    the visualization data is configured for display within and is spatially registered with the text document.

10. The computer-implemented method of claim 9, wherein the visualization data is configured for display in columns within the text document.

11. The computer-implemented method of claim 10, wherein the columns display at least one of photos, logos, graphics or alphanumeric characters that visually indicate a characteristic of the one or more entities within the text document.

12. The computer-implemented method of claim 11, wherein the columns are generated in response to an inquiry.

13. A non-transitory computer readable storage medium tangibly embodying a computer readable program code having computer readable instructions that, when executed, causes a computer device to carry out a method for visualizing entities and relations within a file, the method comprising:
    parsing a content of at least one portion of a file by natural language processing (NLP) based on machine learning, comprising:
        identifying a same entity having different names; and
        performing a relation extraction between the one or more entities detected within the file;
    determining a frequency of one or more entities detected within the at least one portion of the file parsed by NLP, wherein the determination of the frequency is able to include the different names of the same entity;
    generating a visualization data of at least some of the one or more entities detected within the file comprising pointers between entities based on a relation between the some of the one or more entities within the file, wherein:
        the visualization data is configured for display in columns within the file, and
        the columns are auto-generated based on a predetermined threshold of the determined frequency of the one or more entities; and
    outputting the visualization data for display.

14. The non-transitory computer readable storage medium of claim 13, wherein:

the file comprises a text document, and parsing the content further includes performing a relation extraction between the one or more entities, and wherein the visualization data is spatially registered with display of the text document.

15. The non-transitory computer readable storage medium of claim 14, wherein the visualization data includes an indication of the extracted relation between the one or more entities.

16. A computing device comprising:
a processor;
a storage device coupled to the processor;
a visualization module coupled to the processor, wherein an execution of the visualization module by the processor configures the computing device to:
parse a content of at least one portion of a file by natural language processing (NLP) based on machine learning, comprising:
identify a same entity having different names; and
perform a relation extraction between the one or more entities detected within the file;
determine a frequency of one or more entities detected within the at least one portion of the file parsed by NLP, wherein the determination of the frequency is able to include the different names of the same entity;
generate a visualization data of at least some of the one or more entities detected within the file comprising pointers between entities based on a relation between the some of the one or more entities within the file, wherein:
the visualization data is configured for display in columns within the file, and
the columns are auto-generated based on a predetermined threshold of the determined frequency of the one or more entities; and
output the visualization data for display.

17. The computing device according to claim 16, wherein execution of the visualization module further configures the computing device to perform a relation extraction between the one or more entities, and
wherein the visualization data is spatially registered with display of contents of the file.

18. The computing device according to claim 17, further comprising an output device configured to display the visualization data, and wherein the visualization data includes an indication of the extracted relation between the one or more entities.

19. The computer-implemented method of claim 1, wherein an identification of relationships in the relation extraction is identified through a use of domain ontologies.

* * * * *